Sept. 28, 1937. W. ZINGG 2,094,141
GENERATING ALTERNATING CURRENTS
Filed Aug. 1, 1935
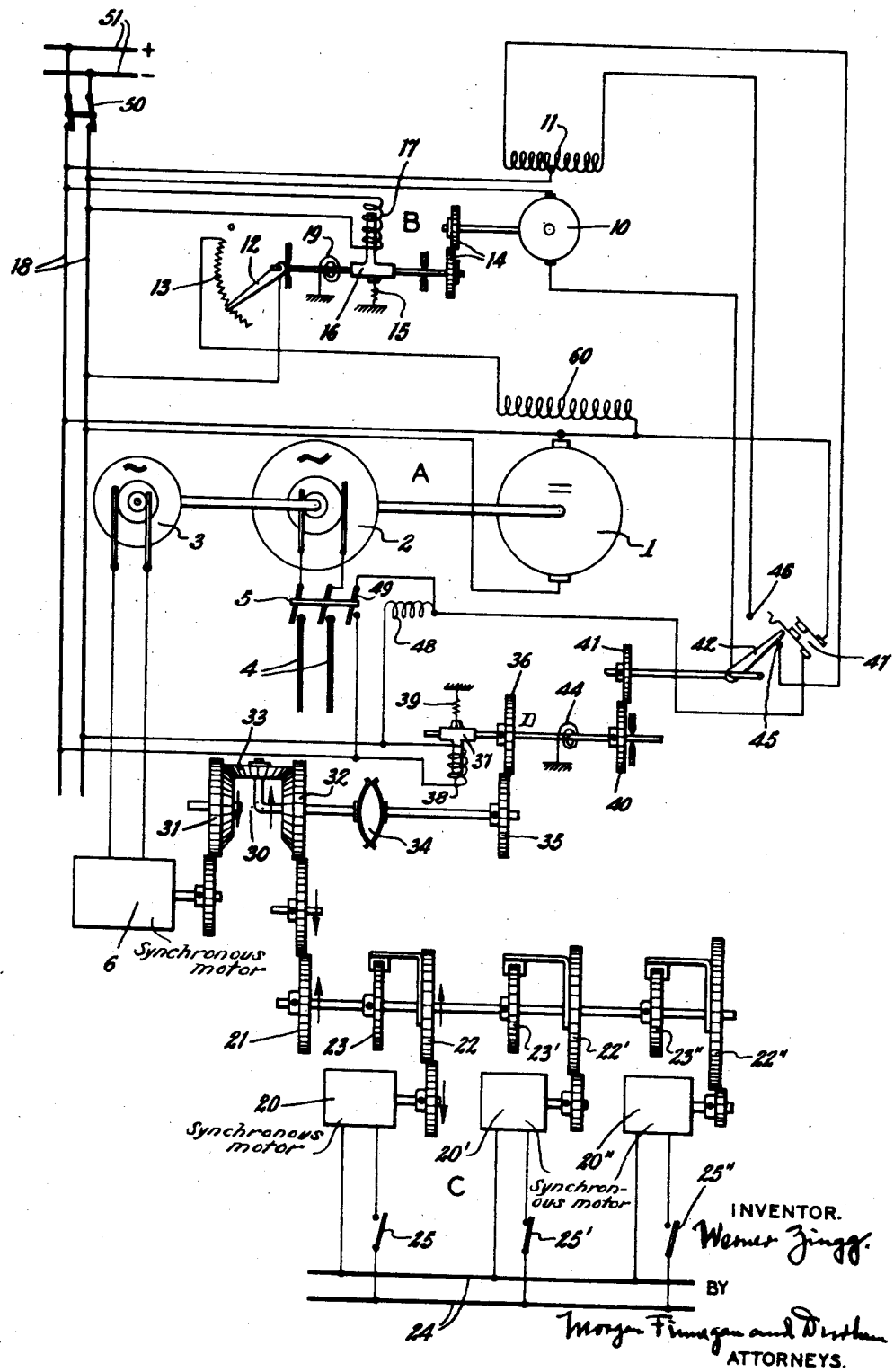
INVENTOR.
Werner Zingg.
BY
Morgan Finnegan and Durham
ATTORNEYS.

Patented Sept. 28, 1937

2,094,141

UNITED STATES PATENT OFFICE 2,094,141

GENERATING ALTERNATING CURRENT

Werner Zingg, Zug, Switzerland, assignor to Landis & Gyr, A-G., a corporation of Switzerland Application August 1, 1935, Serial No. 34,174
In Switzerland August 17, 1934

5 Claims. (Cl. 171—312)

The present invention relates to a novel and improved method of and apparatus for generating controlled frequency alternating current to be superposed on a network for transmission to and operation of resonant relays.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serve to explain the principles of the invention.

In the accompanying drawing, there is shown diagrammatically an illustrative form of an apparatus for carrying the method of the present invention into practice. The lay-out is shown for transmitting three control currents of frequencies which differ from one another, although the transmitting apparatus can be constructed for transmitting any desired number of control currents.

The invention provides a method of and apparatus for producing and transmitting control currents of definite frequency for effecting the remote control of resonance relays in which a generator operates at a variable speed and is connected to the network through a switch when a definite frequency has been reached and also which employs a control device actuating at least the net-work-connecting switch of the generator. Preferably, the control device is actuated by the difference of two magnitudes, of which one is a constant magnitude per se and corresponds in its value for the time being to the frequency of the control current to be transmitted, and the other of which is a variable magnitude that depends on the speed of the generator.

The apparatus for carrying the method into practice preferably comprises a motor generating the constant magnitude, a motor generating the variable magnitude, and a device controlled by the two motors and producing the difference of the two motor motions. This difference of the two motor speeds is transmitted to the control device. Synchronous motors may advantageously be employed for the actuation of the control device, since such motors are well-constructed and operate accurately and have the advantage of a high degree of reliability and high accuracy with respect to the frequency control of the motor generator group. Furthermore, for a new distribution of the range of control frequencies, the synchronous motors need not be replaced by others, since the necessary alterations of speed can easily be obtained by interchanging the wheels of the transmission gear. Also synchronous motors are not dependent upon temperature, and comparatively high powers can be produced, so that by this means the danger of uncertain operation of the control device is entirely precluded. By the employment of synchronous motors the central station from which the superposed currents are supplied can be made extremely simple, inexpensive and convenient.

It will be understood that the foregoing general description and the following detailed description as well, are exemplary and explanatory of the invention but are not restrictive thereof.

Referring now in detail to the illustrative embodiment of the invention as shown diagrammatically in the accompanying drawing, the various elements of the transmitting and generating apparatus may be divided into a motor generator group A, a speed regulating group B, a synchronous motor group C and a controlling group D.

The motor generating group A comprises a shunt motor 1, a generator 2 for alternating current of medium high frequency, and a generator 3 for alternating current of low frequency, these generators being geared to and driven by the shunt motor 1. The current generated by the main generator 2 is transmitted to the distribution network 4 through a solenoid-operated switch 5, while the auxiliary or low frequency generator 3 delivers its output to a self-starting synchronous motor 6.

The speed regulating apparatus comprises a driving motor 10 having a sub-divided field winding 11, either half of which can be placed in circuit for operation of the motor in either direction. Motor 10 is geared to the rotary contact arm 12 of a variable resistance 13 through gearing 14, and one of the gears 14 is mounted on a shaft which can be slightly rocked and is normally held out of engagement with the other gear by means of a spring 15, being held in engagement by means of armature 16 which is acted upon by magnet winding 17 receiving its power from the conductors 18. A spring 19 is provided for resetting the contact arm 12 to a definite position each time that the gears 14 are placed out of mesh by the action of spring 15 upon de-energization of winding 17.

The synchronous motor group C comprises a plurality of self-starting synchronous motors 20, 20' and 20'', which are connected to a common gear 21 by means of the gearings 22, 22' and 22'' and one-way clutches 23, 23' and 23''. The gearings 22, 22' and 22'' are preferably of different gear ratios producing different speeds of rotation of gear 21, and the one-way clutches permit gear 21 to be driven from any one of the motors without interference by the other driving connections. The several synchronous motors 20, 20' and 20'' are individually supplied with power from mains 24 through individual switches 25, 25' and 25'', which may be manually or mechanically actuated in accordance with time or any other desired factor.

The controlling device D comprises differential gearing 30, including the sun wheel 31 driven from synchronous motor 6, the sun wheel 32 driven from gear 21 and the planet wheel 33 which is connected to one side of a friction clutch 34 to drive gear 35. Gear 35 is arranged to mesh with gear 36 whenever armature 37 is attracted by magnetic winding 38 against the tension of spring 39. Gear 36 is connected with a gear 40 meshing with gear 41, which in turn is connected to the contact arm 42. Upon release of the armature 37, spring 44 returns the contact arm 42 to its normal position, which is that shown in the drawing.

Contact arm 42 is adapted to contact with switch contacts 45 and 46, and these contacts are connected to opposite ends of the divided field winding 11 of the regulating motor 10, while the central point of field winding 11 is connected to the conductor 18. Contact arm 42 is connected through motor 10 to the other conductor 18. A momentary switch 47 is closed by the contact arm 42 upon each movement from one contact 45 or 46 to the other, and one contact of switch 47 is connected to one of the conductors 18, while the other contact is connected to one end of the magnet winding 48, which has its other end connected to the other conductor 18 for the operation of switch 5. A switch 49, in parallel to switch 47 and actuated by the magnet winding 48, is provided for holding the main switch 5 closed once the contacts of switch 47 have been momentarily brought together.

The generator driving motor 1 is supplied with current from the conductors 18, and current is supplied to these conductors through switch 50 from the direct current mains 51, switch 50 being moved to and held in closed position so long as any one of the switches 25, 25' or 25'' is closed. Driving motor 1 is provided with a field winding 60 supplied with current from conductors 18 through resistance 13, and as the position of contact arm 12 is varied, the speed of the driving motor 1 is accordingly varied, thereby varying the frequency of the current generated by generators 2 and 3.

In the position of rest, the synchronous motors 20, 20' and 20'' are inoperative, and switch 60 is open. Magnet 16 is de-energized and contact arm 12 is held against its stop by spring 15. Contact arm 42 is similarly held against contact 45 and the main switch 5 is open. The driving motor 1 and the associated generators 2 and 3 are also at rest.

When it is desired to transmit alternating current of one of the desired frequencies over the network 4, one of the switches 25, 25' or 25'' is closed, simultaneously closing the switch 50. Current is thereby supplied to one of the motors 20, 20' or 20'', rotating gear 21 and sun gear 32 at a predetermined speed, the speed depending upon which one of the several motors was placed in operation. The closing of switch 50 also supplies current to the magnet windings 17 and 38, connecting motor 10 with contact arm 12 and connecting the planet wheel 33 with contact arm 42. The closing of switch 50 also supplies current to the driving motor 1 to drive generators 2 and 3, and the current generated by generator 3 operates the self-starting synchronous motor 6 to rotate sun-wheel 31 reversely to the rotation of sun wheel 32. The rotation of these differential gears causes planetary gear 33 to revolve until the speed of gears 31 and 32 is equal in opposite directions, maintaining contact arm 42 against contact 45 to supply current to the left half of field winding 11, and thereby causing rotation of motor 10 to move the contact arm 12 along resistance 13 to reduce the current flowing through field winding 60 of motor 1, thereby increasing the speed of driving motor 1 to cause a concomitant increase in the frequency of the current generated by generators 2 and 3. The operation of motor 10 upon contact arm 12 is relatively slow compared with the speed of operation of contact arm 42. When the speed of motor 6 very slightly exceeds the speed required to drive sun gear 31 at the same rate as sun gear 32, planetary gear 33 is slowly reversely revolved, causing movement of contact arm 42 towards contact 46, and thereby indicating that the driving motor 1 is running at a speed which corresponds to the frequency desired from generator 2. Contact arm 42 causes a momentary closure of switch 47 energizing holding coil 48 to move switch 5 to circuit closing position where it is held by the current flowing to the coil 48 through switch 49. Movement of the contact arm 42 away from contact 45 has interrupted the current supplied to field winding 11, thereby stopping motor 10 and maintaining resistance arm 12 at a fixed position.

While the generator 2 is in operation, the contact arm continues to move towards contact 46, thereby applying current to the right-hand half of field winding 11 to reduce the amount of resistance in series with field winding 60 and thereby reduce the speed of motor 1 and the frequency of the currents generated by generators 2 and 3. This reduction in frequency causes a corresponding reduction in the speed of rotation of motor 6 and causes contact arm 42 to be moved towards and to contact with contact 45, after which the oscillation of contact arm 42 between contacts 45 and 46 continues so long as the switch 25, 25' or 25'' is maintained closed. This alternate reversal of the controlling motor 10 causes a corresponding fluctuation of minor magnitude in the frequency generated by the main generator 2 for transmission over the network to the resonant relays, and this fluctuation is advantageous in that it insures operation of all the relays tuned to that frequency even though the tuning of certain of these relays may not be entirely accurate.

By selecting different gear ratios for the gears 14, 31, 35, 36, 40, and 41, the amount of this fluctuation in speed, and the relative time at which contact arm 42 begins to move, can be accurately predetermined, but the speeds are preferably so selected that contact arm 42 begins to move very slightly before the predetermined desired frequency has been attained.

When it is desired to interrupt the transmission of any one of the frequencies, the corresponding switch 25, 25' or 25'' is opened, opening switch 50 which in turn opens switch 5, magnets 17 and 38 are de-energized, returning contact arms 12 and 42 to their original position and motors 1, 6, and 10 come to rest, thereby restoring all of the parts to their original position and placing the entire apparatus in condition for the transmission of the same or a different frequency.

In place of the synchronous motors 20, 20' and 20'' for producing the different speeds of rotation of sun-wheel 32, a single synchronous motor may be employed supplied with current of predetermined different frequencies as, for instance, from various selectively operable thermionic vacuum tube generators.

The invention in its broader aspects is not limited to the specific mechanisms shown and described but departures may be made therefrom within the scope of the accompanying claims without departing from the principles of the invention and without sacrificing its chief advantages.

What I claim is:

1. Apparatus for the controlled generation and transmission of alternating current of different frequencies for the operation of resonant relays including in combination an alternating current generator, a variable speed motor driving said generator, means regulating the frequency generated by the generator, means driven proportionally to said generator, means operating at any one of a plurality of fixed speeds, means operated by difference in speed between one of said fixed speeds and said proportionally driven means, means controlling the regulating means by said difference-operated means, a switch in circuit with said generator and means controlled by said difference-operated means for closing said switch to supply current to a transmission network.

2. Apparatus for the controlled generation and transmission of alternating current of different frequencies for the operation of resonant relays including in combination an alternating current generator, a shunt wound motor driving said generator, means including a variable resistance in the field windings of the motor for regulating the frequency generated by the generator, means driven proportionally to said generator, means operating at any one of a plurality of fixed speeds, means operated by the difference in speed between one of said fixed speeds and said proportionally driven means, means controlling the variable resistance by said difference-operated means, a switch in circuit with said generator and means controlled by said difference-operated means for closing said switch to supply current to a transmission network.

3. Apparatus for the controlled generation and transmission of alternating current of different frequencies for the operation of resonant relays including in combination an alternating current generator, a variable speed motor driving said generator, means regulating the frequency generated by the generator, means driven proportionally to said generator, means operating at any one of a plurality of fixed speeds, means operated by the difference in speed between one of said fixed speeds and said proportionally driven means, means including a reversible motor acting on the driving motor for controlling the regulating means by said difference-operated means, a switch in circuit with said generator and means controlled by said difference-operated means for closing said switch to supply current to a transmission network.

4. Apparatus for the controlled generation and transmission of alternating current of different frequencies for the operation of resonant relays including in combination an alternating current generator, a variable speed motor driving said generator, means regulating the frequency generated by the generator, means driven proportionally to said generator, means operating at any one of a plurality of fixed speeds, means operated by the difference in speed between one of said fixed speeds and said proportionally driven means, means controlling the regulating means by said difference-operated means, a switch in circuit with said generator, means controlled by said difference-operated means for closing said switch to supply current to a transmission network, and means for resetting all of the elements to a normal position.

5. Apparatus for the controlled generation and transmission of alternating current of different frequencies for the operation of resonant relays including in combination an alternating current generator, a second alternating current generator driven proportionally thereto, a variable speed driving motor for said generators, a regulating resistance in the motor circuit, a synchronous motor driven by said second generator, a plurality of synchronous motors for producing a plurality of constant speeds, individual one-way clutches through which said motors may drive, means for controlling the regulating resistance and including differential gearing having one sun gear driven proportionally to the speed of the synchronous motor and having its other sun gear alternatively coupled to one of the constant speed motors by one of said one-way clutches, and with its planetary pinion connected to operate the regulating means by the difference between said speeds, a switch connecting the first generator to a transmission line, and means controlled by the planetary pinion for closing said switch.

WERNER ZINGG.